US008816259B2

(12) United States Patent
Bruck

(10) Patent No.: US 8,816,259 B2
(45) Date of Patent: Aug. 26, 2014

(54) PACK HEAT TREATMENT FOR MATERIAL ENHANCEMENT

(75) Inventor: Gerald J. Bruck, Oviedo, FL (US)

(73) Assignee: Siemens Aktiengesellschaft, München (DE)

( * ) Notice: Subject to any disclaimer, the term of this patent is extended or adjusted under 35 U.S.C. 154(b) by 139 days.

(21) Appl. No.: 13/441,099

(22) Filed: Apr. 6, 2012

(65) Prior Publication Data

US 2013/0264336 A1 Oct. 10, 2013

(51) Int. Cl.

| | |
|---|---|
| ***B23K 13/01*** | (2006.01) |
| ***H05B 6/26*** | (2006.01) |
| ***H05B 6/04*** | (2006.01) |
| ***H05B 6/36*** | (2006.01) |
| ***B23K 31/00*** | (2006.01) |
| ***B23P 6/00*** | (2006.01) |

(52) U.S. Cl.
USPC ........... 219/635; 219/602; 219/603; 219/610; 219/651; 219/671; 219/672; 219/674; 228/119; 228/248.1; 228/248.5; 29/889.1

(58) Field of Classification Search
USPC ......... 219/635, 602, 603, 610, 651, 671, 672, 219/674; 228/119, 248.1, 248.5; 29/889.1
See application file for complete search history.

(56) References Cited

U.S. PATENT DOCUMENTS 3,867,496 A * 2/1975 Mlavsky et al. ................ 264/71
4,817,859 A * 4/1989 Breitenmoser et al. ........ 228/226
5,192,016 A * 3/1993 Araki et al. ................... 228/147
5,248,079 A * 9/1993 Li ................................ 228/121
5,433,771 A 7/1995 Bachovchin et al.
5,550,348 A * 8/1996 Masaie et al. ............ 219/145.22
5,700,335 A * 12/1997 Phillip .......................... 148/508
5,752,999 A 5/1998 Newby et al.
6,050,477 A * 4/2000 Baumann et al. ............. 228/119
6,063,333 A * 5/2000 Dennis ............................. 419/6
6,164,916 A * 12/2000 Frost et al. .................... 416/189
6,273,925 B1 8/2001 Alvin et al.
6,290,743 B1 9/2001 Alvin et al.
6,312,490 B1 11/2001 Lippert et al.
6,361,575 B1 3/2002 Alvin et al.
6,364,971 B1 * 4/2002 Peterson et al. .............. 148/525
6,369,347 B1 * 4/2002 Zhao et al. .................... 219/118
6,398,837 B1 6/2002 Alvin et al.
6,464,128 B1 * 10/2002 Messelling et al. ........... 228/119
6,662,564 B2 12/2003 Bruck et al.
6,701,764 B2 3/2004 Bruck et al.
6,784,402 B2 * 8/2004 Kataoka et al. ............ 219/146.1
6,810,670 B2 11/2004 Bruck et al.
6,814,544 B2 * 11/2004 Tsukamoto et al. ........ 416/96 R
6,908,516 B2 * 6/2005 Hehmann et al. ............. 148/406
2002/0020734 A1 * 2/2002 Meier ........................... 228/119
2003/0056511 A1 3/2003 Bruck et al.

(Continued)

*Primary Examiner* — Dana Ross
*Assistant Examiner* — Gyounghyun Bae

(57) ABSTRACT

A system and method of restoring material properties is disclosed. A subject material may have one or more of its material properties restored by contacting a packed bed of a reactive material contained within a container with the subject material in which material properties are desired to be restored. The packed bed and the subject material may be heated to restore the material properties. The packed bed may be formed from boron, silicon or other appropriate materials. An inert atmosphere system may have an argon injection system or a helium injection system in communication with the container. A deoxidizing system may be in communication with the container for creating a vacuum within the container or injecting hydrogen into the container.

8 Claims, 2 Drawing Sheets

(56) References Cited

U.S. PATENT DOCUMENTS

2003/0056560 A1 3/2003 Bruck et al.
2003/0094451 A1* 5/2003 Hamaguchi .................. 219/635
2004/0050054 A1 3/2004 Bruck et al.
2005/0106407 A1* 5/2005 Scarlin .......................... 428/615
2006/0260125 A1* 11/2006 Arnold et al. ................ 29/889.1
2007/0039177 A1* 2/2007 Yoshioka et al. ............ 29/889.1
2009/0283572 A1* 11/2009 Volek ............................ 228/119
2010/0012230 A1* 1/2010 Baur et al. .................... 148/525
2010/0126642 A1* 5/2010 Brenner et al. ............... 148/567
2010/0163544 A1* 7/2010 Shirai et al. .................. 219/216
2010/0215984 A1* 8/2010 Oiwa et al. .................... 428/680
2011/0097595 A1* 4/2011 Takeda et al. ................ 428/594

* cited by examiner

PACK HEAT TREATMENT FOR MATERIAL ENHANCEMENT

FIELD OF THE INVENTION

The invention relates to material property restoration system, and more particularly, to a material property restoration system for restoring properties of components used in high temperature environments, such as in gas turbine engines.

BACKGROUND OF THE INVENTION

Surface and near surface regions of materials exposed to high temperature environments, whether intentionally, such as in a furnace, or as a result from ordinary service, such as components used in hot gas paths of gas turbine engines, undergo changes in material properties. For instance, case hardening occurs when steel is exposed to ammonia gas resulting in nitride formation, which causes enhanced component wear performance. In addition, bright annealing of the surface may occur through the elimination of surface oxides. Embrittlement of the general microstructure near the surface may occur from nitride formation, and weldability and fatigue performance may be reduced. In addition, the grain boundaries may be weakened from excessive oxide formation, which may reduce weldability and fatigue strength.

A significant reduction in component life can result from such negative changes because the ability to repair the part is greatly reduced. One such example is a gas turbine component downstream of a combustor. The internal surfaces of transitions in a gas turbine engine are often coated with a thermal barrier coating to protect the material from reaction with combustion gases and to limit metal temperatures. The outer surfaces are typically not coated with the thermal barrier coating and undergo reaction with the atmosphere at elevated temperatures. After long term usage in a turbine engine, precipitation of oxides and nitrides, such as aluminum nitrides (AlN), occurs near the surface. Such precipitations cause embrittlement, which, when weld repairs are attempted, often results in cracking.

SUMMARY OF THE INVENTION

This application is directed to a system and method of restoring material properties. A subject material may have one or more of its material properties restored by contacting a packed bed of a reactive material contained within a container with the subject material in which material properties are desired to be restored. The packed bed and the subject material may be heated to restore the material properties. The packed bed may be formed from boron, silicon or other appropriate materials. In one embodiment, the subject material may be a turbine component that has been exposed to a hot gas path in a turbine engine and has been removed from a turbine engine for restoration.

The material treatment system may be formed from a packed bed of a reactive material contained within a container and a heating system for applying heat to the container to heat the packed bed of reactive material. The packed bed may be formed from materials, such as, but not limited to, boron and silicon. The material treatment system may include an inert atmosphere system having an argon injection system in communication with the container for injecting argon into the container. In another embodiment, the material treatment system may include an inert atmosphere system having a helium injection system in communication with the container for injecting helium into the container. The material treatment system may also include a deoxidizing system in communication with the container for creating a vacuum within the container. In another embodiment, the material treatment system may include a deoxidizing system in communication with the container for injecting hydrogen into the container.

The system may be used with a method of restoring material properties that includes contacting a packed bed of a reactive material contained within a container with a subject material in which material properties are desired to be restored and heating the packed bed and the subject material. Heating the packed bed and the subject material may include heating the packed bed formed at least partially of boron. In another embodiment, heating the packed bed and the subject material may include heating the packed bed formed at least partially of silicon. Heating the packed bed and the subject material may include heating the packed bed in an inert atmosphere filled with argon injected from an argon injection system in communication with the container. In another embodiment, heating the packed bed and the subject material may include heating the packed bed in an inert atmosphere filled with helium injected from a helium injection system in communication with the container. The method may also include creating a vacuum within the container, wherein the vacuum is formed by a deoxidizing system in communication with the container. The method may also include injecting hydrogen in the container via a deoxidizing system in communication with the container.

An advantage of the material treatment system is that the properties, such as ductility and fatigue resistance, of service exposed materials, subject materials, can be restored.

Another advantage of the material treatment system is that repairability, such as weldability and formability, of service exposed materials, subject materials, can be improved.

Yet another advantage of the material treatment system is that the life of high temperature turbine components can be extended.

Another advantage of the material treatment system is that in some instances, certain properties, such as wear performance and appearance, of service exposed materials, subject materials, can be concurrently enhanced.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

As shown in FIGS. 1-4, this invention is directed to a system and method of restoring material properties. A subject material 26 may have one or more of its material properties restored by contacting a packed bed 12 of a reactive material contained within a container 14 with the subject material 26 in which material properties are desired to be restored. The packed bed 12 and the subject material 26 may be heated to restore the material properties. The packed bed 12 may be formed from boron, silicon or other appropriate materials. In one embodiment, the subject material 26 may be a turbine component that has been exposed to a hot gas path in a turbine engine and has been removed from a turbine engine for restoration.

Figure 1:
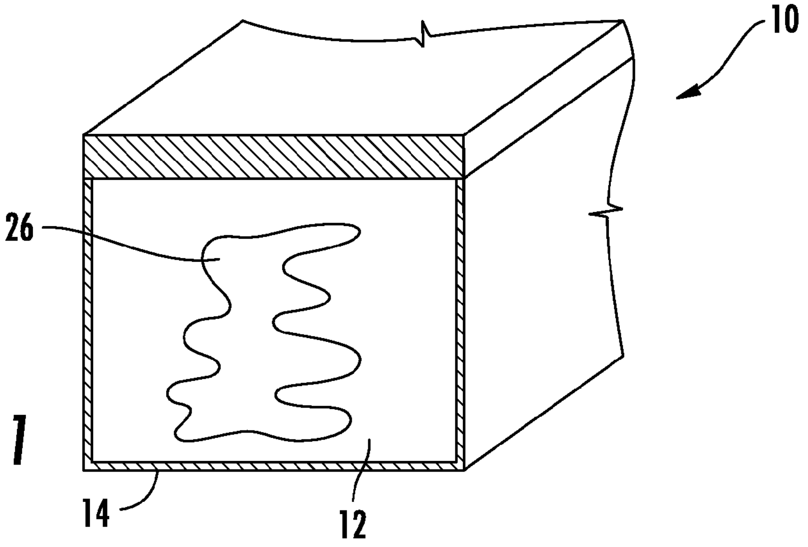
FIG. 1 is a perspective view of a portion of a subject material.
Figure 2:
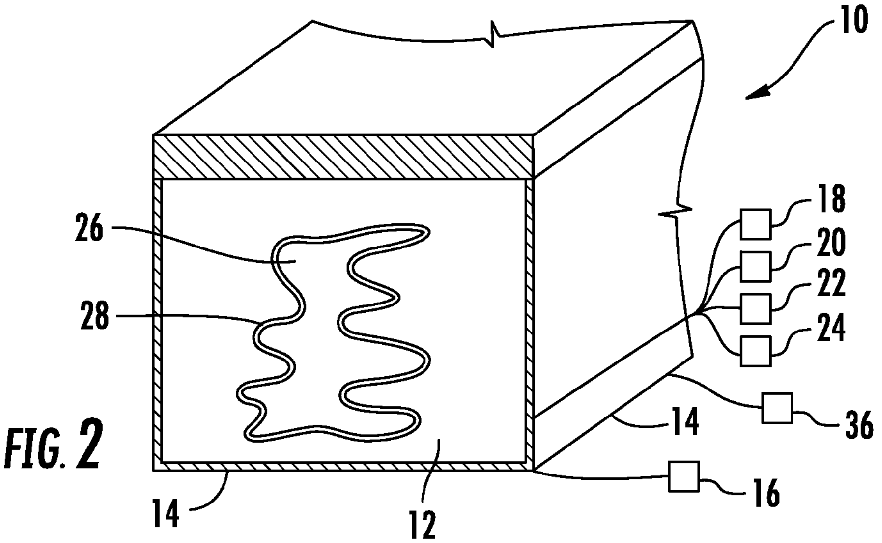
FIG. 2 is a perspective view of a portion of a subject material exposed to a packed bed where the subject material includes aluminum nitride and oxide forms at its surface.
Figure 3:
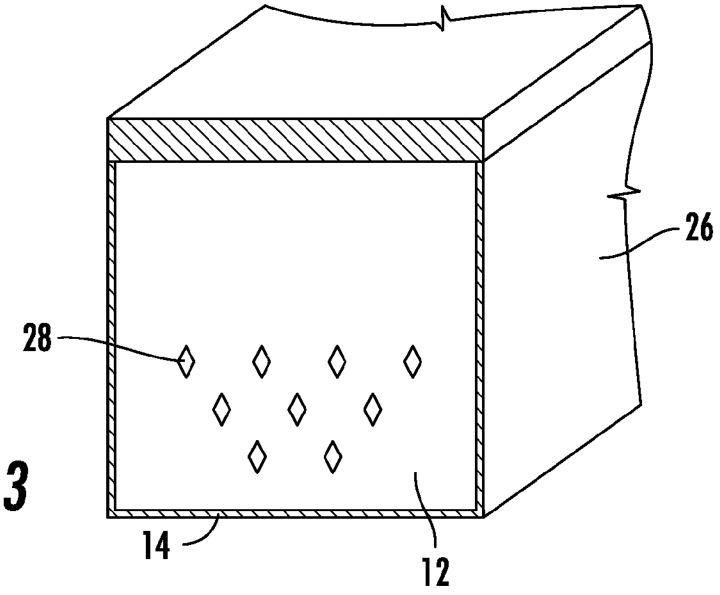
FIG. 3 is a perspective view of a portion of aluminum nitride and oxide forms in the subject material prior to the packed bed heat treatment.
Figure 4:
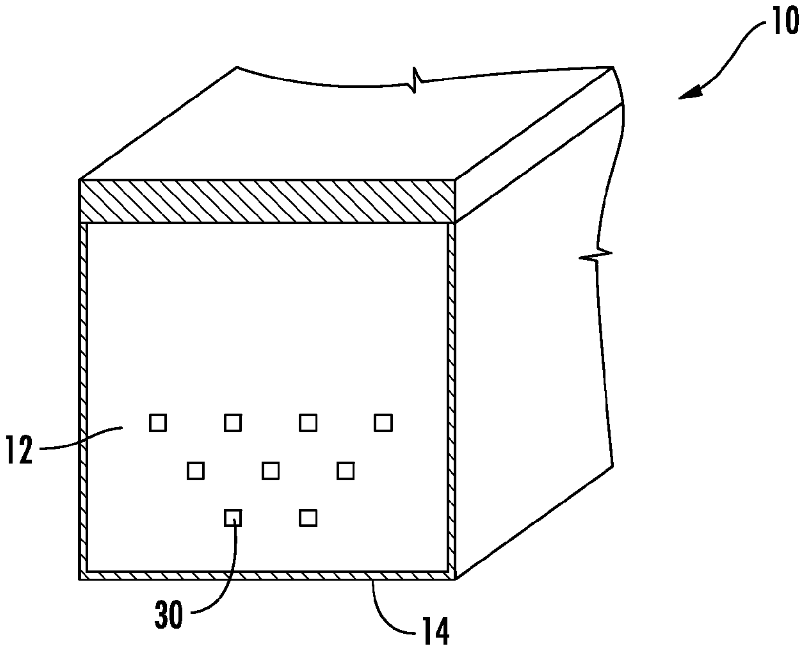
FIG. 4 is a perspective view of a portion of aluminum nitride and oxide forms in the subject material after being subjected to the packed bed heat treatment.

The material treatment system 10 may be configured to address the limitations of advanced engineering materials, which are subject material 26, subjected to long term service at elevated temperatures. In one example, the subject material 26 may be an alloy 617. During use in a turbine engine, aluminum nitride and oxide forms 28, as shown in FIGS. 2 and 3, which results in poor ductility at the surface and near surface regions and reduces the weldability of the alloy 617. A component may be removed from service and subjected to a heat treatment packed in a bed of materials that is selected to getter nitrogen or oxygen, or both from the surface and near surface regions and to restore original or near original material properties. Gettering the components involves the reduction of existing nitrides, oxides, carbides or others, or any combination thereof, that have resulted from service within a turbine component. While property restoration is the prime objective, property improvements could also be achieved by such pack bed heat treatment. For example, the boron nitrides 30, as shown in FIG. 4, that replace aluminum nitrides may improve the wear performance of the subject material 26. Heat treatment temperatures are likely close to the solution annealing temperature of the alloy subject material. For example, the heat treatment temperatures may be about 1100 C (~2000 F) for some nickel based alloys of interest.

A material treatment system 10 may be formed from a packed bed 12 of a reactive material contained within a container 14. The material treatment system 10 may also include a heating system 16 for applying heat to the container 14 to heat the packed bed 12 of reactive material. The packed bed 12 may be formed from boron, such as, but not limited to, a boron powder. Boron may be particularly useful in such application because its relatively small size of 1.17 A atomic radius relative to matrix atoms such as Ni, Co, Fe (1.62 A to 1.72 A) enables it to diffuse through a matrix of the subject material 26. Boron is highly reactive with nitrogen. The enthalpy of formation of boron is approximately 564 joules/mole, which is greater than the enthalpy of formation of 439 joules per mole for aluminum nitride. Use of the material treatment system 10 enables a subject material 26 to diffuse to aluminum nitride boron, getter the nitrogen, form boron nitrides and release aluminum. Substitution of boron nitride for aluminum nitride is relatively innocuous. The hardening from aluminum nitrides is in large part due to strain of the matrix from the relatively large particle. Boron nitrides are relatively small compared to aluminum nitrides and, therefore, produce no significant embrittlement.

In another embodiment, the packed bed 12 may be formed from silicon, such as, but not limited to, a silicon powder. The packed bed 12 may be contained within the container 14. The container 14 may have any appropriate configuration necessary to contain the materials forming the packed bed 12. The container 14 may be formed from any appropriate material capable of handling the heat generated and used within the system 10. Elevated temperature treatment in a reducing environment eliminates oxides. Pack beds 12 of silicon may be used to reduce oxides by the same mechanism described for reduction of nitrides. For example, silicon is relatively small at 1.46 A atomic radius, diffuses well, and has a high affinity for oxygen. A packed bed 12 formed from silicon may therefore be useful for changing relatively large oxides (such as chromium oxides) to relatively smaller oxides (such as silicon oxides), especially at or near the surface of the subject material 26. While boron and silicon powders have been disclosed, the material treatment system 10 may also use other reactive materials, such as, but not limited to Se (1.22 A) and Be (1.40 A) and, for some special and possibly unique purposes C (0.91 A), S (1.09 A), P (1.26 A) and As (1.33 A). Some larger atomic radius elements, such as Mn (1.79 A), could produce superficial effects without themselves diffusing into the matrix but effectively desulfurizes a zone near to the surface. Compounds of elements may also be useful reactive materials.

Small powder size (fine powder of e.g. less than 60 micron size) may be especially useful in that the small powder size provides greater surface area and more complete contact coverage with the subject material 26. The opportunity for diffusion into the material matrix is thereby enhanced. The subject material 26 of complex surface geometry (esp. e.g. notches) is also more thoroughly contacted using fine powder.

The material treatment system 10 may also include an inert atmosphere system 18. An inert atmosphere avoids bed material reaction and further substrate nitridation and oxidation. Alternatively or as a separate step, reducing heat treatment in a vacuum, for example, in a hydrogen atmosphere with or without bed material could help to reduce oxides. In one embodiment, the inert atmosphere system 10 may be an argon injection system 20 in communication with the container 14 for injecting argon into the container 14. The argon injection system 20 may have any configuration capable of containing and injecting argon into the container 14 holding the packed bed 12. In another embodiment, the inert atmosphere system 18 may be a helium injection system 22 in communication with the container 14 for injecting helium into the container 14. The helium injection system 22 may have any configuration capable of containing and injecting argon into the container 14 holding the packed bed 12. In one embodiment, the method includes introducing the inert gas through a perforated metal base or a porous metal base, or both, of the container 14 such that the packed bed 12 powder is fluidized.

The material treatment system 10 may also include a deoxidizing system 24 in communication with the container 14 for creating a vacuum within the container 14. The deoxidizing system 24 may have any appropriate configuration necessary for forming the vacuum. In another embodiment, the deoxidizing system 24 may be a deoxidizing system 24 in communication with the container 14 for injecting hydrogen into the container 14. The deoxidizing system 24 may have any appropriate configuration necessary for injecting hydrogen into the container 14.

The material treatment system 10 may also be configured such that the heating system 16 for applying heat to the container 14 to heat the packed bed 12 of reactive material is at least one inductor heater 16. The inductor heater 16 may be used to heat nickel based super alloys and other appropriate materials.

The material treatment system 10 may also include a vibration forming device 36 capable of creating a vibration in the packed bed 12 to enhance diffusion of the reactive material of the packed bed 12 into a matrix of subject material. The vibration forming device 36 may form a vibration in the container 14, in the packed bed 12, or both. In at least one embodiment, the vibration forming device 36 is an ultrasonic generator 36. During use, packing a subject material 26 in a packed bed 12 and heat treating in an inert atmosphere (such as argon, helium or the like) or a deoxidizing environment (such as vacuum, hydrogen or the like) substantially eliminates aluminum nitrides and other oxides. The material treatment system 10 may use a method of restoring material properties that includes contacting a packed bed 12 of a reactive material contained within the container 14 with a subject material 26 in which material properties are desired to be restored. The packed bed 12 and the subject material 26 may be heated. Heating the packed bed 12 and the subject material 26 may include heating the packed bed 12 formed at least partially of boron. In another embodiment, heating the packed bed 12 and the subject material 26 may include heating the packed bed 12 formed at least partially of silicon. Heating the packed bed 12 and the subject material 26 may include heating the packed bed 12 in an inert atmosphere filled with argon injected from an argon injection system 20 in communication with the container 14. In another embodiment, heating the packed bed 12 and the subject material 26 may include heating the packed bed 26 in an inert atmosphere filled with helium injected from a helium injection system 22 in communication with the container 14. Heating the packed bed 12 and the subject material 26 may also include heating the packed bed 12 and the subject material 26 via an induction heater 16.

The method may also include creating a vacuum within the container 14, wherein the vacuum is formed by the deoxidizing system 24 in communication with the container 14. In another embodiment, the method may include injecting hydrogen in the container 14 via the deoxidizing system 24 in communication with the container 14. The method may also include vibrating the packed bed 12 of the reactive material contained within the container 14 and the subject material 26.

The condition of the outer surface of the subject material 26 may influence the effectiveness of the pack bed heat treatment. For example, a roughened surface could be beneficial both to increase the surface area exposed to bed material and to introduce cold work, such as dislocations, that could help promote diffusion of the bed material and precipitation near the surface.

Some ancilliary processing parameters for enhancing the process described herein includes the following. For example, the pressure of inert or reactive gas within the container 14 can influence the efficiency of packed bed heat treatment. In particular, under hot isostatic pressure (HIP) conditions, microstructural changes such as micropore closure can occur simultaneously with reduction of deleterious precipitates (nitrides and oxides) in the subject material 26 alloy.

In addition to using a furnace to heat the packed bed 12 and subject material 26, induction heating may also be used for heating nickel based super alloys. Furthermore, simultaneous vibration of the subject material 26 by, for example, but not by limitation, ultrasonic exposure, may be useful for enhancing the diffusion of packed bed material into the matrix of the subject material 26.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A material treatment system, comprising:

a packed bed of a reactive material contained within a container;

a heating system for applying heat to the container under hot isostatic pressure conditions to heat the packed bed of reactive material, wherein the heating system applies heat within the container to an internally contained metal component such that the heating system are heated to a temperature less than a solution annealing temperature of the internally contained component; and a vibration forming device capable of creating a vibration in the packed bed to enhance diffusion of the reactive material of the packed bed into a matrix of subject material.

2. The material treatment system of claim 1, wherein the packed bed is formed from the group consisting of boron and silicon.

3. The material treatment system of claim 1, further comprising an inert atmosphere system having an argon injection system in communication with the container for injecting argon into the container.

4. The material treatment system of claim 1, further comprising an inert atmosphere system having a helium injection system in communication with the container for injecting helium into the container.

5. The material treatment system of claim 1, further comprising a deoxidizing system in communication with the container for creating a vacuum within the container.

6. The material treatment system of claim 1, further comprising a deoxidizing system in communication with the container for injecting hydrogen into the container.

7. The material treatment system of claim 1, wherein the heating system for applying heat to the container to heat the packed bed of reactive material comprises at least one inductor heater.

8. The material treatment system of claim 1, wherein the vibration forming device is an ultrasonic generator.

* * * * *